US005719839A

United States Patent [19]
Naito

[11] Patent Number: 5,719,839
[45] Date of Patent: Feb. 17, 1998

[54] OPTICAL INFORMATION RECORDING/ REPRODUCING APPARATUS INCORPORATING MEMORY FOR ACCUMULATING RECORDING AND REPRODUCTION DATA

[75] Inventor: Yuichi Naito, Yokohama, Japan

[73] Assignee: Canon Kabushiki Kaisha, Tokyo, Japan

[21] Appl. No.: 710,413

[22] Filed: Sep. 17, 1996

[30] Foreign Application Priority Data

Sep. 19, 1995 [JP] Japan .................................... 7-239704

[51] Int. Cl.$^6$ ......................................................... G11B 7/08
[52] U.S. Cl. ............................... 369/54; 369/58; 369/59; 369/60
[58] Field of Search ......................... 369/54, 58, 47, 369/48, 49, 50, 59, 32, 60

[56] References Cited

U.S. PATENT DOCUMENTS

| 4,538,257 | 8/1985 | Klinger | 369/50 X |
|---|---|---|---|
| 4,719,612 | 1/1988 | Kenjo | 369/58 X |

*Primary Examiner*—Muhammad N. Edun
*Attorney, Agent, or Firm*—Fitzpatrick, Cella, Harper & Scinto

[57] ABSTRACT

In an information recording/reproducing apparatus in which recording of information is effected by scanning an information track of an information recording medium with a recording light spot an verification is effected simultaneously with recording by scanning with a verifying light spot, there are provided a memory for storing the recording data released from the memory, and a second resister for temporarily storing reproduction data obtained for verification. The data transfer is performed in such a manner that the recording data from the memory are held in succession by a predetermined unit of data in the first register and the reproduction data are held in succession by predetermined unit of data in the second register.

6 Claims, 7 Drawing Sheets

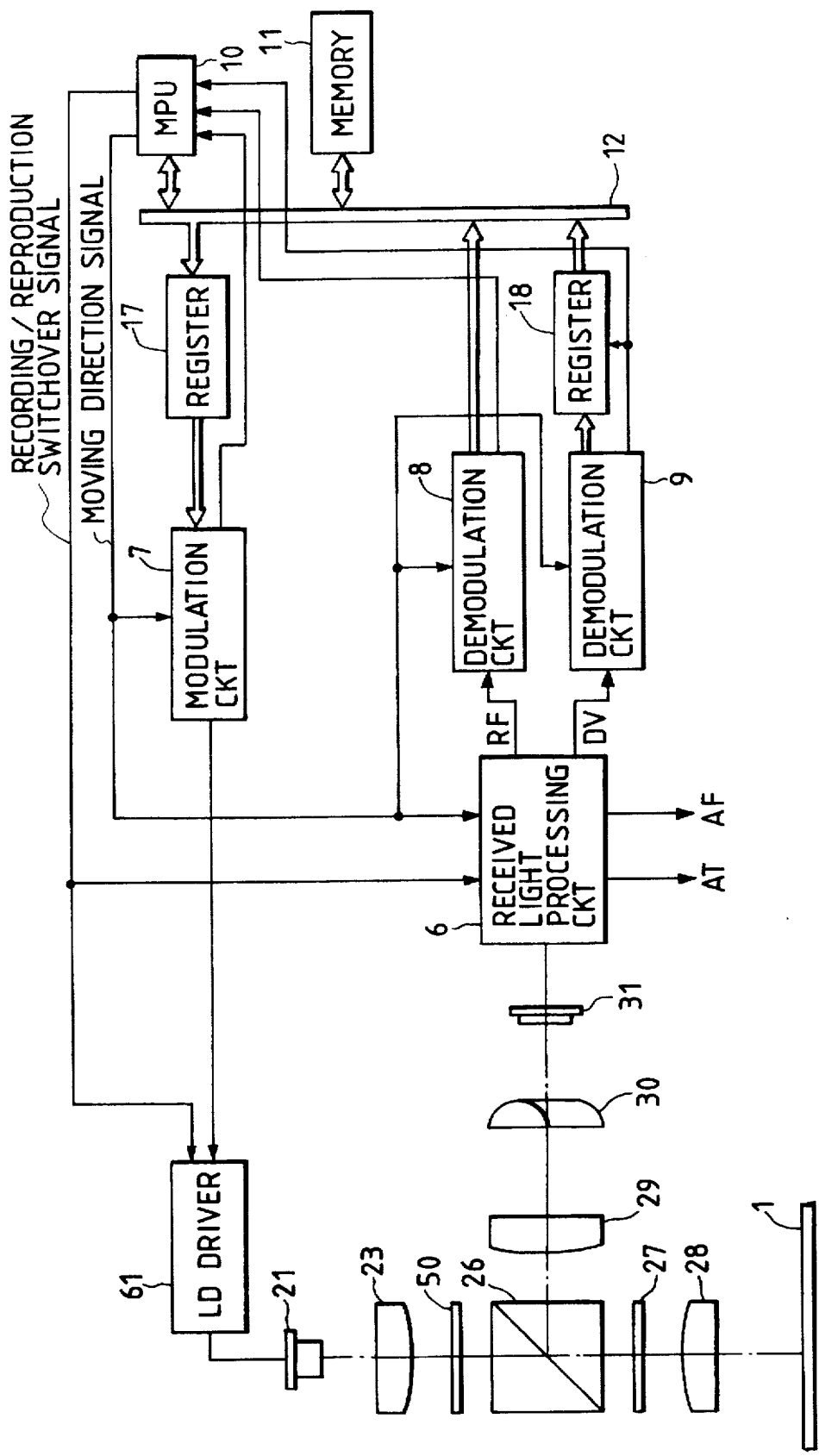

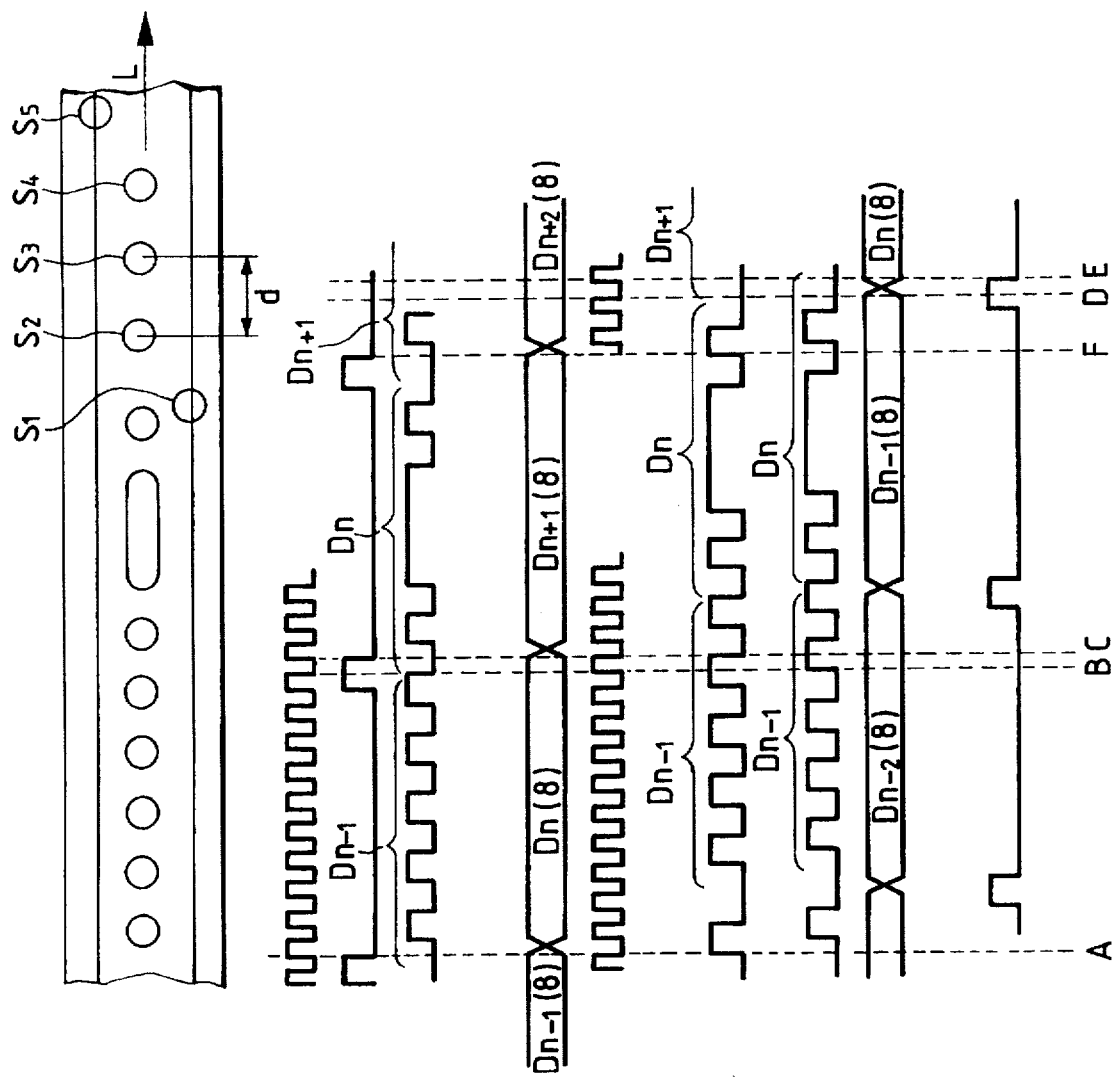

OPTICAL INFORMATION RECORDING/ REPRODUCING APPARATUS INCORPORATING MEMORY FOR ACCUMULATING RECORDING AND REPRODUCTION DATA

BACKGROUND OF THE INVENTION

1. Field of the Invention

The present invention relates to an optical information recording/reproducing apparatus for effecting optical recording and/or reproduction of information on or from an information recording medium.

2. Related Background Art

Conventionally there are known recording media of various forms such as disk, card or tape, for optical recording of information or reproduction of recorded information. These information recording media include those allowing both recording and reproduction, and those allowing reproduction only. The information recording on a recording medium, allowing such recording, is achieved by scanning an information track with a micro light spot formed by a light beam modulated according to recording information, thereby recording information in the form of a train of optically detectable information bits.

Also reproduction of the information from a recording medium is achieved by scanning the information bit train on an information track with a light spot of such a constant power level as not to effect recording on the recording medium, detecting light reflected from or transmitted through the recording medium and reproducing information from thus obtained detection signal. An optical head, employed in such information recording to or reproduction from the recording medium is rendered movable, relative to the recording medium, in the directions along and intersecting information tracks, and brings the light spot to the desired information track by relative movements in these directions, thereby scanning such information track.

The optical head is provided with an objective lens for converging a light beam, and such objective lens is so supported as to be movable, with respect to the main body of the optical head, independently in a direction toward the recording medium (focusing direction) and in a direction perpendicular to the information track on the recording medium (tracking direction). Such objective lens is generally supported by means of an elastic member, and the movements of the objective lens in the focusing and tracking directions are generally achieved by actuators utilizing magnetic interaction.

Among the optical information recording media mentioned above, a card-shaped recording medium (hereinafter called optical card) is expected to grow significantly in demand, as it is small, light in weight and convenient for carrying and has a relatively large memory capacity. FIG. 1 is a schematic plan view of a WORM optical card 1, of which an information recording surface bears a plurality of information tracks 2 arranged in parallel along a direction F-L. Also on the information recording surface, there is formed a home position 3 as a reference for access to information tracks 2, which are arranged in an order 2-1, 2-2, 2-3 . . . starting from a position closest to the home position 3. Also respectively adjacent to these information tracks 2, there are provided tracking tracks 4-1, 4-2, 4-3, . . . as shown in FIG. 2. These tracking tracks are used as guides for auto tracking (AT) operation, for so controlling the light spot as not to deviate from the object information track, at the scanning with the light spot in the information recording or reproduction.

Such AT control is achieved by a servo control circuit which detects, in the optical head, the deviation (AT error) of the light spot from the information track and effects negative feedback of thus detected information to a tracking actuator for driving the objective lens in the tracking direction. Thus the light spot is so controlled as not to deviate from the object information track, by a movement of the objective lens, relative to the main body of the optical head, in the tracking direction (direction D).

Also in order to maintain the light beam in the light spot of a suitable size on the optical card, in the scanning operation of the information track with the light spot in the information recording or reproduction, the objective lens is subjected to auto focusing (AF) control. Such AF control is achieved by detecting deviation (AF error) of the light spot from the focused state in the optical head, and effecting negative feedback of thus detected signal to a focusing actuator for moving the objective lens in the axial direction to move the objective lens, relative to the main body of the optical head, in the focusing direction, thereby focusing the light spot on the surface (the recording layer) on the optical card.

In FIG. 2, S1, S2, S3, S4 and S5 indicate light spots irradiating the information tracks of the optical card. The AT control is executed utilizing the light spots S1 and S5 which are partially positioned on the tracking tracks 4-2 and 4-3, respectively, while the light spot S3 is used for the AF control, formation of information bits at the recording operation, and the reading of the information bits at the reproducing operation. Also the light spots S2 and S4 are used for verification of the information bits immediately after the recording thereof. In FIG. 2, the information bits 5-1, 5-2 are formed by the light spot S3, by the scanning operation with the light spot respectively in directions L and F.

FIG. 3 is a block diagram of an optical information recording/reproducing apparatus utilizing the above-explained optical card as the recording medium. In FIG. 3, there are provided an MPU 10 constituting a main control circuit for controlling various units of the apparatus, and a memory 11 for temporarily storing recording data transferred from an unrepresented upper control apparatus or reproduced data read from the optical card 1. The MPU 10 and the memory 11 are connected by a data bus 12. An error encoder 14 adds an error code, for error detection and error correction, to the recording data. The error code can be, for example, the Reed-Solomon product code. A modulation circuit 7 processes the recording data, with the added error code, into a signal suitable for recording.

An LD driver 61 for driving a semiconductor laser 21 constituting the light source switches the driving operation of the semiconductor laser 21 according to a record/ reproduction switch signal from the MPU 10. At information recording, the semiconductor laser 21 is driven by a modulation signal from the modulation circuit 7, and thus modulated light beam scans an information track on the optical card 1 to record the information. At information reproduction, the semiconductor laser 21 is driven with such a constant power incapable of recording, and reproduction of information is achieved by scanning information track with such light beam of constant power.

FIG. 4 is a block diagram showing an example of the modulation circuit 7. At first recording data are transferred from the MPU 10 through the data bus 12 to a modulator 241, in which the recording data are modulated according to a predetermined modulation method and then transferred to a P/S (parallel-serial) converter 242. An oscillator 250 generates a clock signal of a constant frequency, and the P/S converter 242 converts, in synchronization with such clock signal, the output signal of the modulator 241 into a serial signal which is released as a train of information bits (recording signal). The MPU 10 provides the P/S converter 242 with a moving direction signal, indicating the scanning direction of the light spot, and arrangement of the information bits in the train is switched according to such moving direction signal. Specifically, in case of information recording on the information track of the optical card both in forward and in reverse directions, the arrangement of the bits is switched for each byte, according to the moving direction signal, in such a manner that the information bits are recorded in the same direction. The clock signal from the oscillator 250 is subjected to frequency division in a frequency divider 251, and the obtained frequency divided signal is used, for example, for synchronization for each byte in the P/S converter 242. The data can be modulated by various systems such as 8-10 modulation, 2-7 modulation or MFM, and such system can be suitably selected according to the kind or form of the recording medium.

The semiconductor laser 21 employed in this structure generates a light beam of a wavelength of 830 nm, polarized perpendicularly to the track. There are also provided a collimating lens 23, a diffraction grating 50 in which gratings are two-dimensionally arranged for splitting the light beam, a polarizing beam splitter 26, a ¼ wavelength plate 27, an objective lens 28, a spherical lens 29, a cylindrical lens 30, and a photodetector 31. The photodetector 31 is composed of four photosensor elements and a 4-sectioned photosensor element of which light receiving surface is divided into 4 sections. The above-mentioned optical elements are integrally formed as an optical head which can make access to a desired information track of the optical card 1.

A light beam emitted from the semiconductor laser 21 is converted by the collimating lens 23 into a parallel beam, which enters the diffraction grating 50 and is divided thereby into five effective beams (0th-order diffracted light and ±1st-order diffracted lights in two directions). These five light beams enter as P-polarized light beams into and are transmitted through the polarizing beam splitter 26, and enter the ¼ wavelength plate 27, thereby being converted into circularly polarized light beams. The circularly polarized five beams are converged by the objective lens 28 into micro light spots on the optical card 1, thereby forming the spots S1 and S2 (+1st-order diffracted light), S3 (0th-order diffracted light), and S4 and S5 (−1st-order diffracted light) shown in FIG. 2. As explained in the foregoing, the spot S3 is used for recording, reproduction and AF control, while the spots S1 and S5 are used for AT control, and the spots S2 and S4 are used for verification.

As shown in FIG. 2, the spots S1 and S5 are present on the mutually neighboring tracking tracks, while the spots S2, S3 and S4 are present on the information track 2 between the tracking tracks. The spots S2 and S4 for verification are positioned in front of and behind the spot S3. Parts of the irradiating light beams are reflected by the optical card 1 enter the objective lens 28 and are converted thereby into parallel beams, which are converted by the ¼ wavelength plate 27 into polarized beams of which polarizing direction is rotated by 90° from that of the entering beams. These beams enter as S-polarized beams into the polarizing beam splitter 26 and are reflected thereby toward a detection of the optical system, thereby being separated from the entering light beams coming from the semiconductor laser 21. The detection optical system is composed of the spherical lens 29, the cylindrical lens 30 and the photodetector 31, and the AF control based on astigmatism is conducted by the combination of the spherical lens 29 and the cylindrical lens 30. The five light beams reflected from the optical card 1 are detected by the photodetector 31, composed of plural photosensor elements. The received light signals from the photosensor elements of the photodetector 31 are supplied to and subjected to a predetermined processing in a received light processing circuit 6, thereby providing a reproduced information signal, a tracking control signal, a focus control signal and a verification signal.

FIG. 5 is a circuit diagram showing the details of the received light processing circuit shown in FIG. 3. A photodetector 31, shown in FIG. 3, is composed of photosensor elements 31a, 31b, 31d, 31e and a 4-sectioned photosensor element 31c. The spots illustrated on the light receiving surfaces of the photosensor elements indicate the lights reflected from the light spots irradiating the tracks shown in FIG. 1. More specifically, the lights reflected from the light spots S1, S5 for the AT control are received by the photosensor elements 31a, 31e, while the light reflected from the light spot S3 for recording reproduction and AF control is received by the 4-sectioned photosensor element 31c, and the lights reflected from the light spots S2, S4 for verification are received by the photosensor elements 31b, 31d.

The output signals of the photosensor elements 31a to 31e of the photodetector 31 are supplied to respectively corresponding gain switching circuit 101 to 108. More specifically the output of the photosensor element 31a is supplied to the gain switching circuit 101, while the output of the photosensor element 31b is supplied to the gain switching circuit 102, and the outputs of the four photosensor sections of the 4-sectioned photosensor element 31c are respectively supplied to the gain switching circuits 103 to 106. Also the output of the photosensor element 31d is supplied to the gain switching circuit 107, and the output of the photosensor element 31e is supplied to the gain switching circuit 108. These gain switching circuit 101 to 108 switch the signal amplifying gain so as to respectively match the recording power and the reproducing power of the semiconductor laser 21, according to the record/reproduction gain switching signal from the MPU 10. More specifically, upon information recording, the optical output of the semiconductor laser 21 is modulated to the recording power and the reproducing power, and the signal amplifying gain is switched accordingly, thereby correcting the signals from the photosensor elements 31a to 31e to respectively constant signal levels.

The output signals of the gain switching circuits, 101, 108 are supplied to a subtraction circuit 119, which calculates the difference of these signals to obtain an AT control signal. Among the gain switching circuit 103 to 106 corresponding to the four photosensor sections of the 4-sectioned photosensor element 31c, the output signals of the gain switching circuit 103, 105 corresponding to the diagonally positioned photosensor sections in the photosensor element 31c, and those of the gain switching circuit 104, 106 corresponding to the other diagonally positioned photosensor sections are respectively added in addition circuits 117, 118. The outputs of the addition circuits 117, 118 are supplied to a subtraction circuit 120 which calculates the difference of these outputs to obtain an AF control signal. Also the outputs of the addition circuits 117, 118 are added in an addition circuit 121 to obtain a summation signal of the 4-sectioned photosensor element 31c. The summation signal of the addition circuit 121 is binarized in comparison with a reference voltage Vr in a comparator 123, thereby providing a reproduced information signal supplied to a succeeding demodulation circuit 8.

The outputs of the gain switching circuits 102, 107 are supplied to a selector switch 122, by which either output is selected according to the moving direction signal from the MPU 10. More specifically, when the light spot scans in a direction F as shown in FIG. 2, the selector switch 122 is positioned at a side F whereby the signal from the photosensor element 31d is selected. When the light spot scans in a direction L, the selector switch 122 is positioned at a side L whereby the signal from the photosensor element 31b is selected. Since the verifying light spots S2, S4 are formed on two sides of the recording light spot S3, the signal used for verification is so switched according to the forward or reverse scanning direction of the light spots on the optical card 1, that the signal reproduced by the light spot following the recording light spot is always selected for the verification. The signal selected by the selector switch 122 is binarized in comparison with a reference voltage Vr in a comparator 124 to generate a direct verification signal, which is supplied to a demodulation circuit 9.

The AT control signal and the AF control signal generated in the received light processing circuit 6 are supplied to an unrepresented servo control circuit and used for tracking control and focusing control. More specifically, a servo control circuit effects the tracking control and the focusing control by driving unrepresented tracking actuator and focusing actuator to displace the objective lens 28 in the tracking and focusing directions, in such a manner that the light spot does not deviate from the information track and is focused onto the surface of the recording medium.

The reproduced information signal and the direct verification signal from the received light processing circuit 6 are respectively supplied to demodulation circuits 8, 9, of which an example is shown in FIG. 6. The reproduced information signal (or direct verification signal) RF is supplied to a PLL oscillator 247, to generate a synchronization clock signal, which is supplied to a CK port of a flip-flop 243, which thus synchronizes the reproduced information signal with the synchronization clock signal. Since the relative movement velocity between the recording medium and the light spot has certain fluctuation, there is generally adopted synchronization according to the actual movement. The signal synchronized with the synchronization clock signal in the flip-flop 243 is rearranged in a S/P (serial-parallel) converter 244 into a parallel signal in the unit of a byte. In such conversion, in order to identify the top position of each byte in the binary serial signal, a synchronizing pattern is usually added to the recording data.

Such synchronizing pattern is composed of a pattern that does not appear in the recording data. For example, in case of the 8-10 modulation for modulating the data of 256 types into data of 1024 types with redundancy, the synchronizing pattern is selected from the patterns that are not assigned to the data, among 1024 types. A synchronization detector 248 detects such synchronizing pattern, thereby controlling the parallel output of the S/P converter 244 consisting of a shift register.

The initial (start) bit of the serial data entering the S/P converter 244 can be LSB or MSB, depending on the scanning direction of the light spot on the optical card. Therefore, the arrangement of the output bits of the S/P converter 244 is switched according to the moving direction signal from the MPU 10. More specifically, in the information reproduction, the arrangement of data is switched for each byte, in such a manner that the data are always arranged in the same order, regardless of the scanning direction of the light spot. The output data of the S/P converter 244 are demodulated by a data demodulator 245. The clock signal from the PLL oscillator 247 is also subjected to frequency division in a frequency divider 249, and the frequency divided signal is used, in the data demodulator 245 and an error decoder 15, for data synchronization in the unit of a byte, after the serial/parallel conversion of the data.

The data demodulated in the demodulation circuit 8 are supplied to an error decoder 15, which effects error detection and error correction, thereby generating reproduced data. In the ordinary information reproduction, the data are reproduced in the above-explained manner, and the reproduced data are supplied to an upper control apparatus under the control of the MPU 10. Also, upon information recording, the verification data are demodulated in the demodulation circuit 9, and stored in a buffer memory 13. The buffer memory 13 normally stores data of a sector or a track, and the stored data are then read by an error decoder 15 for error detection and error correction. In the storage of the demodulated data in the buffer memory 13, the timing is controlled by the clock signal from the frequency divider 249 shown in FIG. 6. The MPU 10 effects verification by comparing the reproduced data after error correction with the recording data stored in a memory 11, for each sector or each track.

In the following there will be explained an information recording operation with forward and reverse recording directions on the optical card 1. At first, in response to a recording command from the upper control apparatus, the MPU 10 stores the recording data, transferred from the upper control apparatus, in the memory 11. Then the MPU 10 transfers the recording data to the error encoder 14 to add error correction codes, for the error detection and error correction at the data reproduction, and effects encoding. After the encoding the MPU 10 transfer the recording data to the modulation circuit 7, which effects modulation according to the predetermined modulation system as explained in relation to FIG. 4. Thus the information recording is executed by driving the semiconductor laser 21 according to the obtained train of the information bits.

However, in the conventional optical information recording/reproducing apparatus explained in the foregoing, as the data are produced from the direct verification signal simultaneously with the recording operation, it is necessary to provide a buffer memory for temporarily storing the reproduction data for one sector or one track. As a result, there is a problem that the structure of the apparatus is complicated to thereby result in expensive.

SUMMARY OF THE INVENTION

The object of the present invention is to provide an optical information recording/reproducing apparatus that can dispense with the buffer memory for storing the reproduced data for verification, thereby enabling simplification of the structure and reduction of the cost.

The above-mentioned object can be attained, according to the present invention, by an optical information recording/reproducing apparatus adapted to record information by scanning an information track of an information recording medium with a recording light spot and to effect verification, simultaneous with the recording, by scanning with a verifying light spot which immediately follows the above-mentioned recording light spot, comprising:

a memory for storing recording data;

a first register for temporarily storing the recording data released from the memory; and a second register for temporarily storing reproduction data obtained for verification;

wherein data are transferred in such a manner that the recording data in the memory are held in succession by a predetermined unit of data in the first register, and the reproduction data are held in succession by a predetermined unit of data in the second register.

BRIEF DESCRIPTION OF THE DRAWINGS

FIG. 7 is a block diagram of an embodiment of the present invention; and

FIGS. 8A to 8J are timing charts for explaining the data recording operation of the embodiment shown in FIG. 7.

DETAILED DESCRIPTION OF THE PREFERRED EMBODIMENTS

Figure 1:
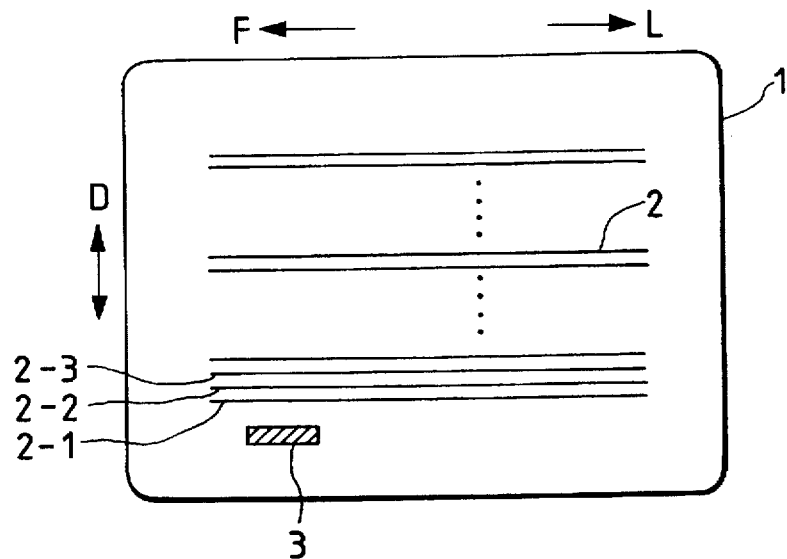
FIG. 1 is a plan view of an optical card, showing the arrangement of tracks on an information recording surface thereof.
Figure 2:
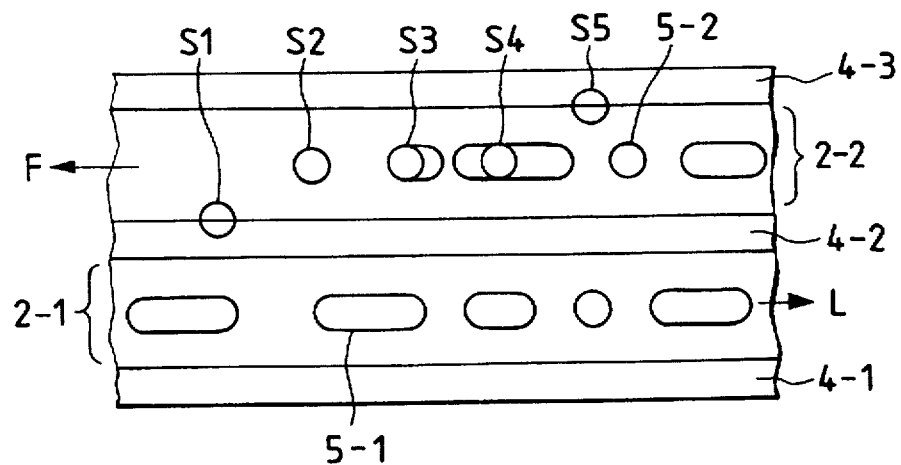
FIG. 2 is a view showing the state of scanning of an information track of the optical card, shown in FIG. 1, with light spots.
Figure 3:
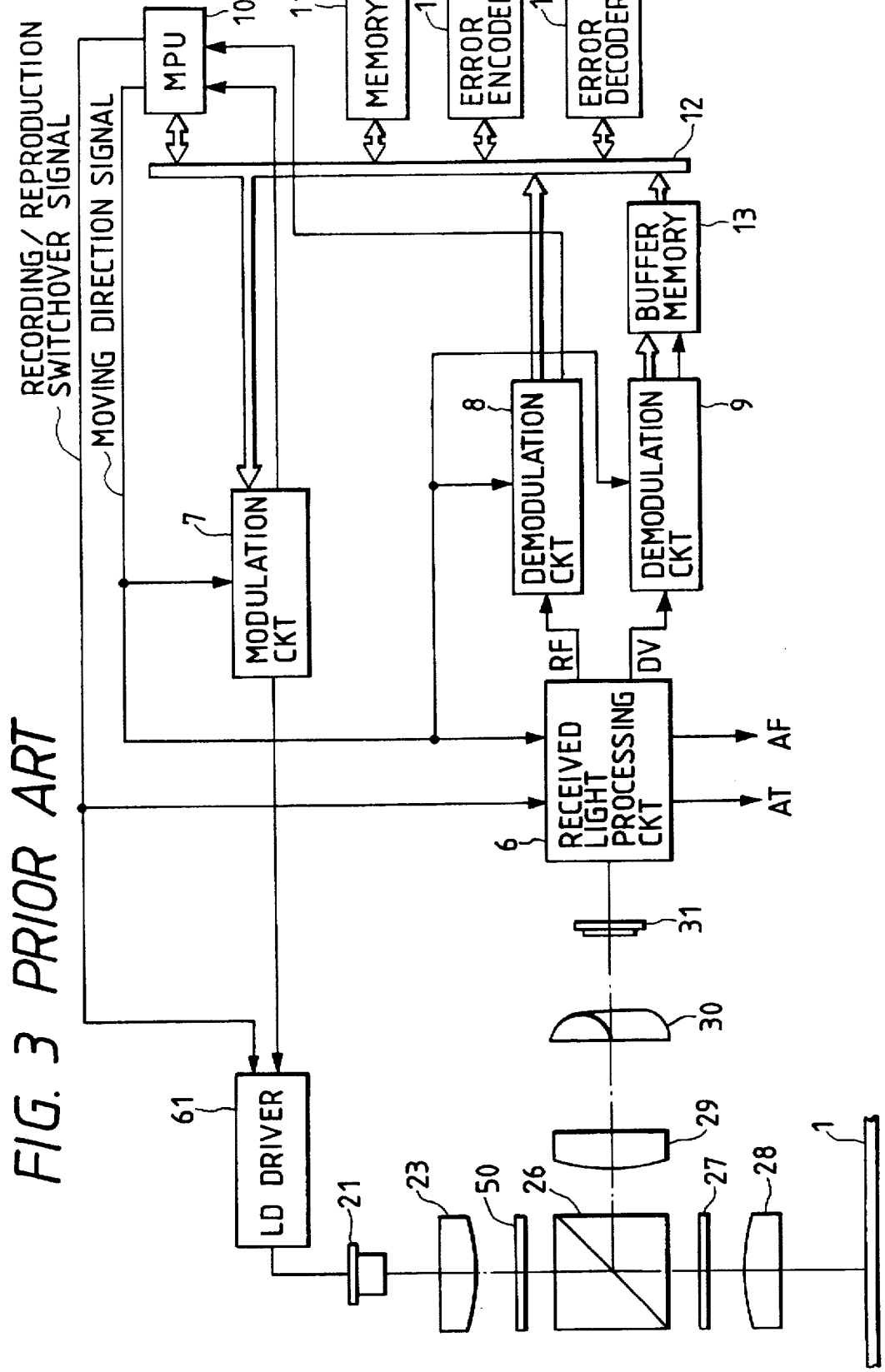
FIG. 3 is a block diagram of a conventional optical card information recording/reproducing apparatus.

Now the present invention will be clarified in detail by an embodiment thereof, shown in FIG. 7, wherein components same as those in the conventional apparatus in FIG. 3 are represented by same numerals and will not be explained further. More specifically, the semiconductor laser 21, the collimating lens 23, the diffraction grating 50, the polarizing beam splitter 26, the ¼ wavelength plate 27, the objective lens 28, the spherical lens 29, the cylindrical lens 30 and the photodetector 31 are same as those shown in FIG. 3. These optical elements are integrally formed as an optical head, and serve to irradiate the optical card 1 with five light spots S1 to S5, as already explained in relation to FIG. 2. The optical head and the optical card 1 are rendered to effect a relative reciprocating motion along the direction of the information tracks by means of an unrepresented mechanism, and such reciprocating motion causes the information tracks to be scanned by the light spots from the optical head in reciprocating manner, whereby the information recording onto the optical card 1 or the information reproduction therefrom is executed in the forward and reverse relative motion of the optical card 1.

Also the received light processing circuit 6, the demodulation circuits 8, 9, the MPU 10, the memory 11 (work memory for the MPU 10) the data bus 12 and the LD driver 61 are same as those shown in FIG. 3. In FIG. 7, the error encoder 14 and the error decoder 15 are omitted. In the present embodiment, a register 17 for storing the recording data for one byte is provided at the input side of the modulation circuit 7, and a register 18 for storing the output data for one byte of those of the demodulation circuit 9 is provided, instead of the buffer memory 13, at the output side of the demodulation circuit 9. The demodulation circuit 9 provides the register 18 and the MPU 10 with a data timing signal, which is used for holding the reproduction data in the register 18 and for requesting the readout of the reproduction data to the MPU 10.

The functions of the present embodiment will be explained with reference to FIGS. 8A to 8J. FIG. 8A shows the state of recording of information bits, corresponding to the recording data, by scanning the information track of the optical card 1 with the light spots S1 to S5. In the illustrated state, the light spots scan in a direction L shown in FIG. 2, and, in such state, the light spot S2 is used for verification, among the two light spots S2 and S4. The recording light spot S3 is spaced by a distance d from the verifying light spot S2 or S4. FIG. 8B shows the clock signal of the oscillator 250 in the modulator 7 explained in FIG. 4, and, in synchronization with this clock signal, the P/S converter 242 effects conversion of the recording data into a serial signal. Consequently the clock signal of the oscillator 250 determines the transfer rate of the P/S converter 242.

Figure 4:
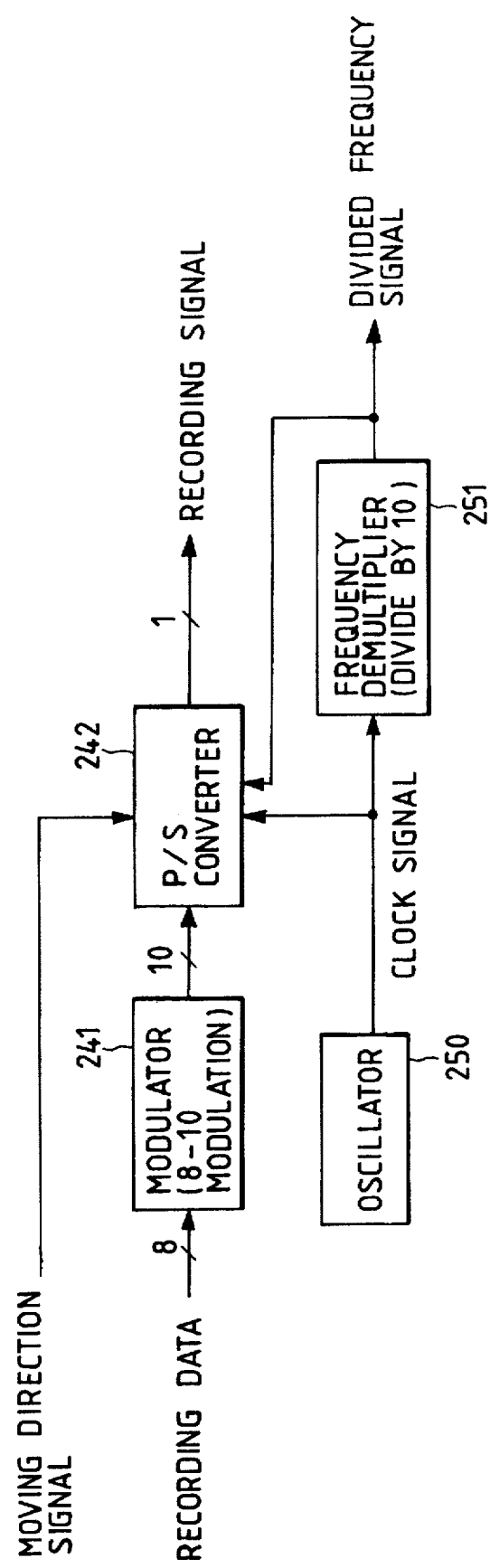
FIG. 4 is a block diagram showing the details of a modulation circuit 7 in the apparatus shown in FIG. 3.

FIG. 8C shows the frequency divided signal of the clock signal in FIG. 8B, namely the output signal of the frequency divider 251, which divides the frequency of the clock signal obtained from the oscillator 250 in FIG. 4, and a cycle of this frequency divided signal corresponds to the length of a byte. The frequency divided signal is used as a data loading signal for the P/S converter 242 and a recording data request signal to the MPU 10. The frequency divided signal from the frequency divider 251 is supplied, as explained in the foregoing, as the recording data request signal to the MPU 10, and in response to the detection of the downshift of the frequency divided signal, shown in FIG. 8C, by the MPU 10 at a time point A, data Dn(8) to be recorded after data Dn−1(8) as shown in FIG. 8E are read from the memory 11 and stored in the register 17. The data Dn(8) are held in the register 17 until next data Dn+1(8) are stored therein. The data Dn(8) of one byte, stored in the register 17, are then sent to the modulator 241 and modulated for example by the 8-10 modulation.

Then, when the frequency divided signal assumes a high level state as shown in FIG. 8C and the clock signal is shifted down as shown in FIG. 8B at a time point B, data D(10) modulated in the modulator 241 are loaded in the P/S converter 242 and are converted into serial data in synchronization with the downshift of the clock signal. FIG. 8D shows the serial data obtained by conversion in the P/S converter 242. These serial data are supplied to the LD driver 61, which drives the semiconductor laser 21 according to the serial data to intensity modulate the recording light spot S3, thereby recording a train of information bits, corresponding to the serial data, on the information track as shown in FIG. 8A. At a time point C, the write-in of the next data Dn+1(8) is requested.

Figure 5:
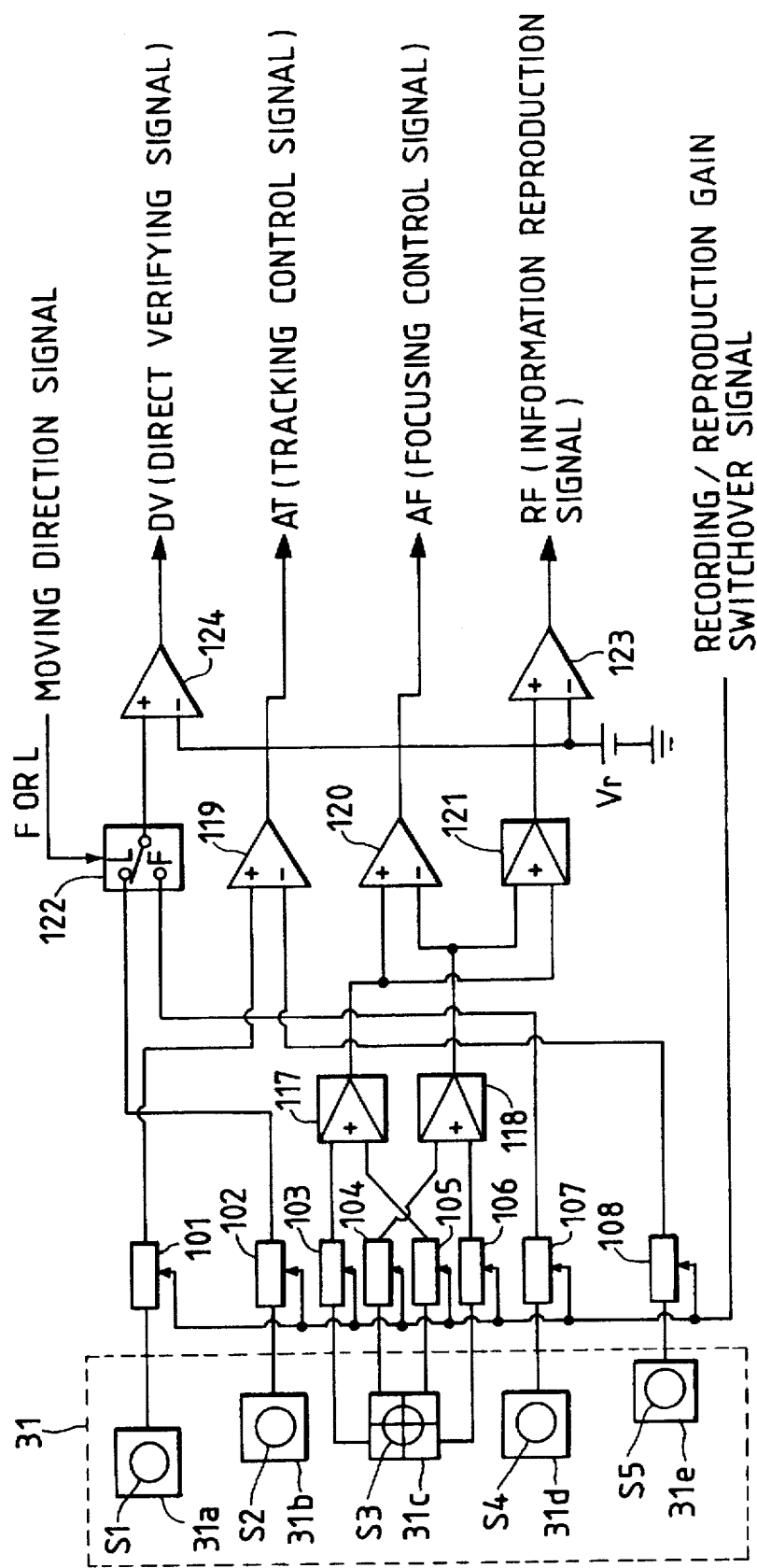
FIG. 5 is a circuit diagram showing the details of a received light processing circuit 6 in the apparatus shown in FIG. 3.
Figure 6:
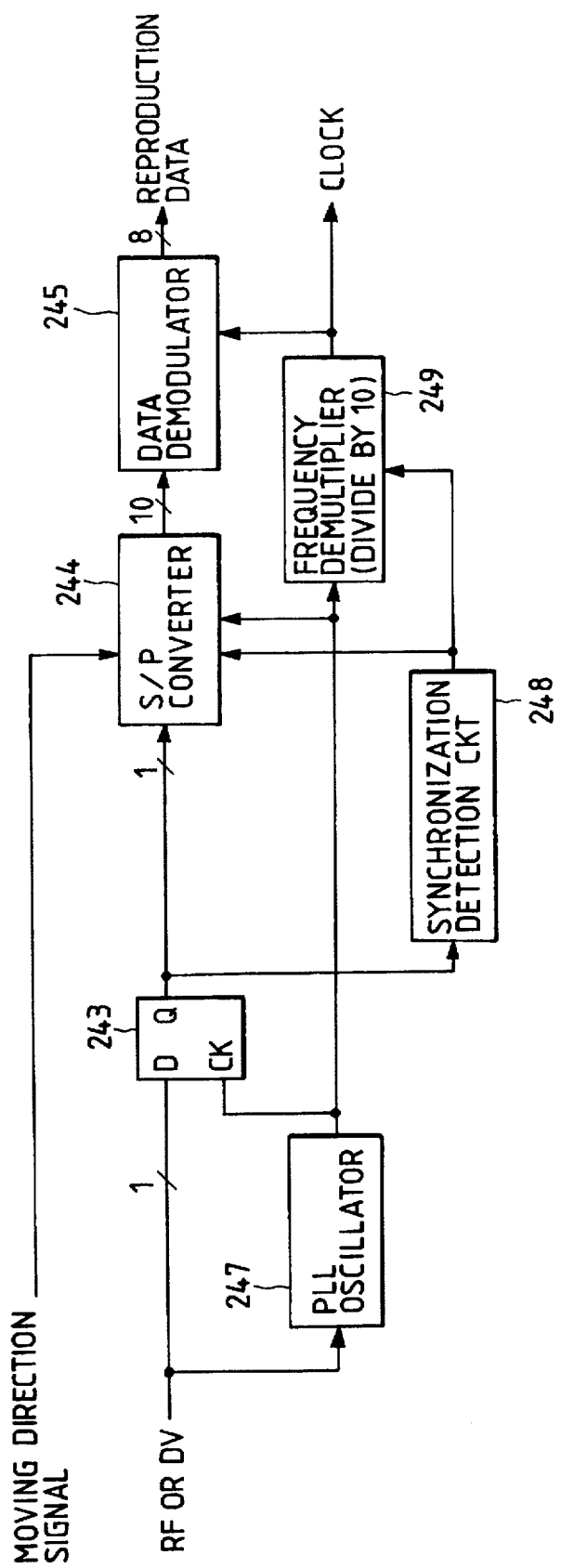
FIG. 6 is a circuit diagram showing the details of demodulation circuits 8, 9 in the apparatus shown in FIG. 3.

On the other hand, as the light spots move in the direction L, the received light processing circuit 6 shifts the switch 122 to the side L according to the moving direction signal from the MPU 10 as shown in FIG. 5, thereby selecting the output of the photosensor element 31b, receiving the reflected light from the verifying light spot S2. Consequently the comparator 124 binarizes the signal from the photosensor element 31b, and supplies the demodulation circuit 9 with thus binarized signal as the DV (direct verification) signal, which is shown in FIG. 8G. The demodulation circuit 9, composed as shown in FIG. 6, causes the PLL oscillator 247 to generate a synchronizing clock signal shown in FIG. 8F, from thus received DV signal. Also the flip-flop 243 releases the DV signal, as shown in FIG. 8H, in synchronization with the synchronizing clock signal, and the released signal is rearranged in the unit of a byte, in the P/S converter 244.

The rearranged data from the S/P converter 244 are demodulated in a data demodulator 245. On the other hand, a synchronization detector 248, upon detecting the synchronizing pattern from the DV signal, sends a detection signal to a frequency divider 249, which in response initiates the frequency division of the synchronizing clock signal as shown in FIG. 8L. In response to the frequency divided signal from the frequency divider 248, the data from the data demodulator 245 are held in the register 18, and the read-out of the data from the register 18 is requested to the MPU 10. More specifically, at a time point D when the serial data Dn synchronized with the synchronizing clock signal are rearranged in the unit of a byte in the S/P converter 244, the frequency divided signal shown in FIG. 8G assumes a high level state and the synchronizing clock signal shown in FIG. 8F is shifted down, whereupon the serial data Dn from the data demodulator 245 are held in the register 18. Then, in response to the detection of the downshift of the frequency divided signal, shown in FIG. 8G, by the MPU 10 at a time point E, the demodulated data Dn(8) are read from the register 18 and stored at an address of the memory 11, different from the address of the recording data.

Then, at a time point F when the frequency divided signal shown in FIG. 8C is shifted down, the write-in of the data Dn+2, succeeding to the data Dn+1, is requested to the MPU 10. Since the recording light spot S3 and the verifying light spot S2 are separated by the distance d, and since the recording data and the DV signal are mutually shifted in phase by a predetermined time, the request for the data write-in by the frequency divided signal from the modulation circuit 7 does not take place simultaneously with the request for the data read-out by the frequency divided signal from the demodulation circuit 9. As the operating speed of the MPU 10 is very high, it is possible to complete the write-in into the register 17 and to detect the request for read-out from the demodulation circuit 9 during a time period of the time point F to the time point D. It is thus also possible, upon detection of the request for data read-out, to read the data from the register 18, thereby effecting the data write-in and read-out in continuous manner in the unit of a byte.

Through the above-explained processes there are completed the recording of the recording data of a byte, the preparation of verification signal by reproducing thus recorded data, and the storage of the verification signal in the memory 11, and the data recording is thereafter continued in a similar manner in the unit of a byte. Then, when the transfer of the recording data for example of a sector, stored in the memory 11, to the register 17 is completed, the MPU 10 no longer responds to the recording data request signal from the modulation circuit 7, whereby the recording operation is terminated. Then, when the last reproduced data are read from the register 18 and stored in the memory 11, the MPU 10 effects verification by comparing the recording data and the reproduced data stored in the memory 11, and, in case of a verification error, effects re-recording in a next recording position. The reproduced data used in the comparison are not subjected to the error correction by the unrepresented error decoder, but there may also be employed the data subjected to the error correction.

The embodiment explained in the foregoing, writing the recording data in the register 17 in the unit of a byte, holding the reproduced data in the register 18 in the unit of byte and storing such reproduced data in succession in the memory 11, allows to dispense with the buffer memory of a capacity corresponding to a sector or a track, required in the conventional art, thereby enabling to simplify the structure of the apparatus and to reduce the cost thereof. The elimination of the buffer memory, which generally includes an address control circuit and is more expensive than a register or an SRAM, enables a significant cost reduction.

In the foregoing embodiment, the data transfer for the modulation circuit 7, demodulation circuit 9 and memory 11 is executed by the ordinary memory reading, writing, I/O reading and writing operations of the MPU 10, but it is also possible to increase the process speed by direct writing from the memory to the I/O or from the I/O to the memory by means of a direct memory access controller (DMAC).

What is claimed is:

1. An optical information recording/reproducing apparatus adapted to record information by scanning an information track of an information recording medium with a recording light spot and to effect verification, simultaneous with the recording, by scanning with a verifying light spot which immediately follows said recording light spot, comprising:

a memory for storing recording data;

a first register for temporarily storing the recording data released from said memory; and a second register for temporarily storing reproduction data obtained for verification;

wherein data transfer is conducted in such a manner that the recording data from said memory are held in succession by a predetermined unit of data in said first register, and said reproduction data are held in succession by a predetermined unit of data in said second register.

2. An apparatus according to claim 1, further comprising:

a modulation circuit and a demodulation circuit;

wherein said first register is provided at the input of said modulation circuit, and said second register is provided at the output of said demodulation circuit.

3. An apparatus according to claim 1, wherein said first and second registers are adapted to hold data in the unit of a byte.

4. An apparatus according to claim 1, wherein said reproduction data held in said second register are stored in succession in said memory, and at each storage of the reproduction data of a predetermined capacity in said memory, verification is executed by comparison of said recording data and said reproduction data.

5. An apparatus according to claim 4, wherein said predetermined capacity is a data amount corresponding to a track or a sector.

6. An apparatus according to claim 4, wherein the transfer of the reproduction data from said second register to said memory is executed after the transfer of recording data, succeeding to the recording data corresponding to said reproduction data, to said first register.

* * * * *

UNITED STATES PATENT AND TRADEMARK OFFICE
CERTIFICATE OF CORRECTION

PATENT NO. : 5,719,839  Page 1 of 6
DATED : February 17, 1998
INVENTOR(S) : YUICHI NAITO It is certified that error appears in the above-identified patent and that said Letters Patent is hereby corrected as shown below:

ON THE COVER PAGE

AT ITEM [57] "ABSTRACT"

line 5, "spot an" should read --spot, and--; and
      line 13, "by" should read --by a--.

COLUMN 1:

Line 13, "Conventionally" should read --Conventionally,--;
      Line 14, "disk, card or tape," should read --a disk, a card or a tape,--;
      Line 24, "Also" should read --Also,--;
      Line 30, "from" should read --from the--;
      Line 36, "such" should read --such an--;
      Line 39, "such" should read --such an--;
      Line 44, "Such" should read --Such an--;
      Line 51, "called" should read --called an--;
      Line 59, "order" should read --order of--;
      Line 61, "Also" should read --Also,--; and
      Line 64, "for" should read --for an--.

UNITED STATES PATENT AND TRADEMARK OFFICE
CERTIFICATE OF CORRECTION

PATENT NO. : 5,719,839        Page 2 of 6
DATED : February 17, 1998
INVENTOR(S) : YUICHI NAITO It is certified that error appears in the above-identified patent and that said Letters Patent is hereby corrected as shown below:

COLUMN 2,

Line 4, "of" should read --of the--;
    Line 6, "Thus" should read --Thus,--;
    Line 10, "Also" should read --Also,--;
    Line 17, "of" should read --of the--;
    Line 30, "Also" should read --Also,--;
    Line 34, "in" should read --in the--;
    Line 47, "the" should read --a--;
    Line 55, "thus" should read --thus a--;
    Line 60, "scanning" should read --scanning an--;
    Line 61, "such" should read --such a--; and
    Line 64, "first" should read --first,--.

COLUMN 3,

Line 3, "such" should read --such a--;
    Line 8, "such" should read --such a--;
    Line 9, "in" should read --in a--;
    Line 20, "such" should read --such a--;
    Line 23, "of" should read --having--;
    Line 31, "which" should read --which the--;
    Line 59, "card 1" should read --card 1,--;
    Line 62, "which" should read --which the--; and
    Line 65, "detection" should read --direction--.

UNITED STATES PATENT AND TRADEMARK OFFICE
CERTIFICATE OF CORRECTION

PATENT NO. : 5,719,839
DATED : February 17, 1998
INVENTOR(S) : YUICHI NAITO It is certified that error appears in the above-identified patent and that said Letters Patent is hereby corrected as shown below:

COLUMN 4,

Line 22, "recording" should read --recording/--;
Line 27, "supplied to respectively" should read --respectively supplied to--;
Line 29, "circuit" should read --circuits--;
Line 30, "cally" should read --cally,--;
Line 35, "Also" should read --Also,--;
Line 39, "circuit" should read --circuits--;
Line 53, "circuit" should read --circuits--;
Line 56, "circuit" should read --circuits--;

and

Line 63, "Also" should read --Also,--.

COLUMN 5,

Line 28, "driving" should read --driving an--;
Line 43, "has" should read --has a--;
Line 46, "a" should read --an--;
Line 47, "such" should read --such a--;
Line 51, "Such" should read --Such a--;
Line 52, "in" should read --in a--; and
Line 57, "such" should read --such a--.

UNITED STATES PATENT AND TRADEMARK OFFICE
CERTIFICATE OF CORRECTION

PATENT NO. : 5,719,839
DATED : February 17, 1998
INVENTOR(S) : YUICHI NAITO

It is certified that error appears in the above-identified patent and that said Letters Patent is hereby corrected as shown below:

COLUMN 6,

Line 20, "the-storage" should read --the storage--;
Line 26, "following" should read --following,--;
Line 32, "Then" should read --Then,--;
Line 36, "encoding" should read --encoding,-- and "transfer" should read --transfers--;
Line 39, "Thus" should read --Thus,--;
Line 49, "in expensive." should read --in the apparatus being expensive.--;
Line 61, "simultaneous" should read --simultaneously--; and
Line 64, "comprising:" should read --the apparatus comprising--.

COLUMN 7,

Line 2, "verification;" should read --verification,--;
Line 34, "Now" should read --Now,-- and "clarified" should read --discussed--;
Line 35, "same" should read --the same--;
Line 37, "by" should read --by the--;
Line 42, "are" should read --are the--;

UNITED STATES PATENT AND TRADEMARK OFFICE
CERTIFICATE OF CORRECTION

| | | |
|---|---|---|
| PATENT NO. : | 5,719,839 | |
| DATED : | February 17, 1998 | |
| INVENTOR(S) : | YUICHI NAITO | |

It is certified that error appears in the above-identified patent and that said Letters Patent is hereby corrected as shown below:

COLUMN 7

Line 49, "such" should read --such a--;
       Line 51, "in" should read --in a--;
       Line 55, "Also" should read --Also,--; and
       Line 58, "are" should read --are the--.

COLUMN 8,

Line 9, "such" should read --such a--;
       Line 15, "Consequently" should read --Consequently,--;
       Line 57, "quently" should read --quently,--;
       Line 59, "with" should read --with the--;
       Line 63, "from" should read --from the--; and
       Line 64, "Also" should read --Also,--.

COLUMN 9,

Line 11, "D" should read --D,--;
       Line 40, "in" (first occurrence) should read --in a--;
       Line 42, "processes" should read --processes,--;
       Line 44, "of" should read --of a-- and "reproducing" should read --reproducing the--;

UNITED STATES PATENT AND TRADEMARK OFFICE
CERTIFICATE OF CORRECTION

PATENT NO. : 5,719,839       Page 6 of 6
DATED : February 17, 1998
INVENTOR(S) : YUICHI NAITO It is certified that error appears in the above-identified patent and that said Letters Patent is hereby corrected as shown below:

COLUMN 9

Line 48, "data" should read --data,-- and "example" should read --example,--; and
    Line 55, "in" (second occurrence) should read --in a--.

COLUMN 10,

Line 1, "of" should read --of a--;
    Line 3, "allows" should read --provides the ability--;
    Line 22, "simultaneous" should read --simultaneously--;
    Line 24, "said" should read --the-- and "com-" should read --said apparatus com- --; and
    Line 40, "circuit;" should read --circuit,--.

Signed and Sealed this

Fifteenth Day of September, 1998

Attest:

BRUCE LEHMAN

*Attesting Officer*      *Commissioner of Patents and Trademarks*